United States Patent [19]

Sweeney et al.

[11] Patent Number: 5,195,896
[45] Date of Patent: Mar. 23, 1993

[54] MANIKIN CONSTRUCTION

[75] Inventors: Kevin Sweeney, Woodstock, Wis.; Collin Montigue, Lake Katrine, N.Y.

[73] Assignee: Simulaids, Inc., Woodstock, N.Y.

[21] Appl. No.: 843,639

[22] Filed: Feb. 28, 1992

[51] Int. Cl.$^5$ .................. G09B 23/28; A61H 31/00
[52] U.S. Cl. .................. 434/265; 434/270; 128/28
[58] Field of Search .......... 434/265, 270, 275; 128/28, 30.2

[56] References Cited

U.S. PATENT DOCUMENTS

| | | |
|---|---|---|
| 3,199,225 | 8/1965 | Robertson et al. ............ 434/265 |
| 3,916,535 | 11/1975 | Hewson ........................... 434/265 |
| 4,611,998 | 9/1986 | Ramamurthy .................. 434/265 |
| 4,797,105 | 1/1989 | Green .............................. 434/265 |
| 4,802,857 | 2/1989 | Laughlin ......................... 434/265 |
| 4,984,987 | 1/1991 | Brault et al. .................... 434/265 |

OTHER PUBLICATIONS

Simulaids Catalogue, "Med-E-Train", Jun. 1978.

Primary Examiner—Gene Mancene
Assistant Examiner—Cindy A. Cherichetti
Attorney, Agent, or Firm—Schweitzer Cornman & Gross

[57] ABSTRACT

A CPR training manikin having a separable, tiltable head mounted on the neck of the torso; a flexible nose/mouthpiece removably supported on said head portion; a ball valve assembly removably mounted to said head; flexible airway tubing communicating between said head and a lung bag through the ball valve, whereby lung bag is adapted to be inflated by breathing into the nose/mouthpiece while the head is tilted into a CPR-correct position in which the ball in the ball valve assembly is unseated, the orientation of the head in the CPR-correct position properly corresponding to the orientation of a head of a patient which will allow the administrator of CPR to inflate a human lung, and said ball valve is adapted to be closed by the displacement by gravity of the ball into the valve seat when the manikin head is not properly tilted or oriented into a position in which a human patient may be resuscitated by CPR techniques.

7 Claims, 3 Drawing Sheets

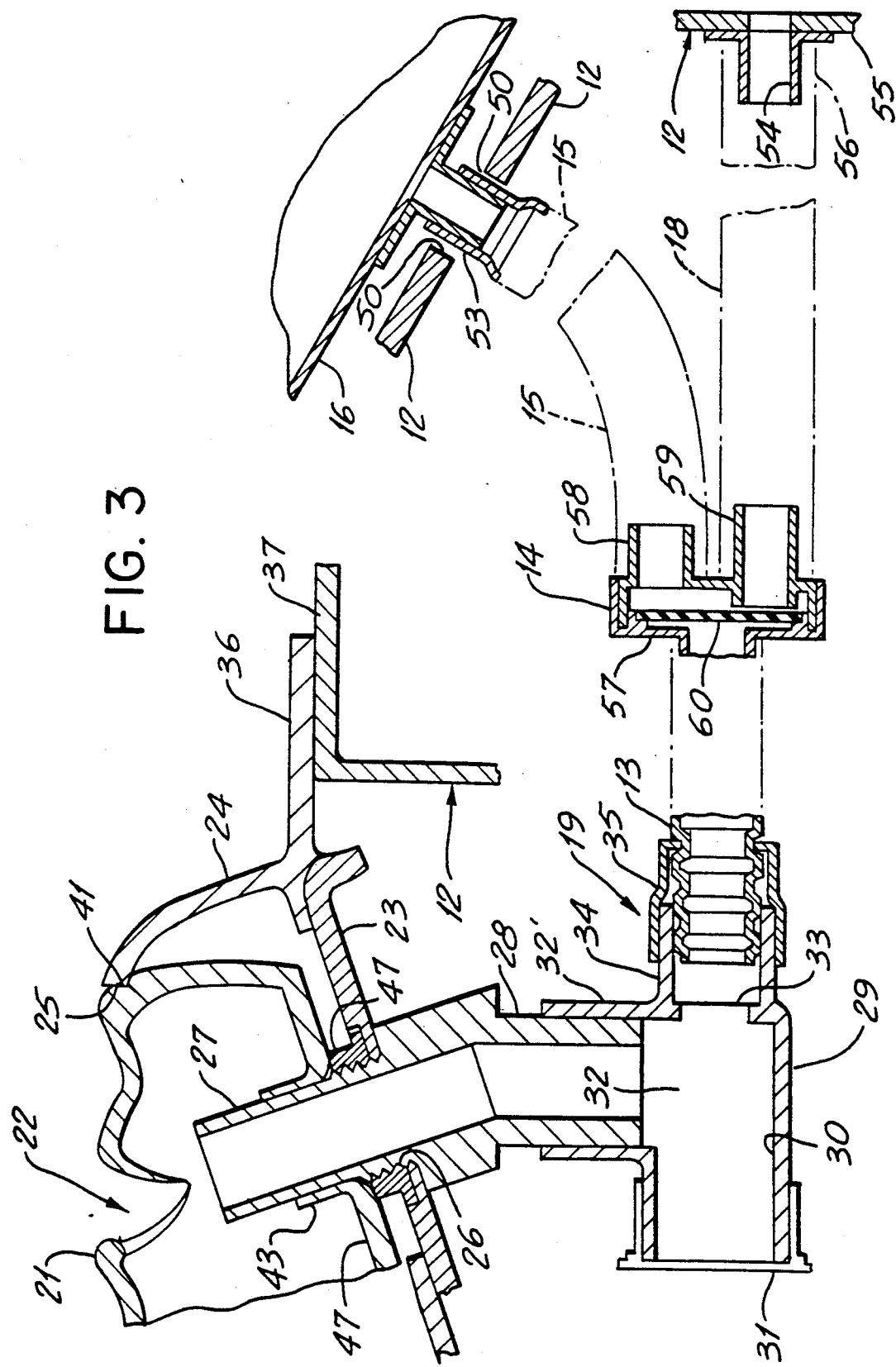

MANIKIN CONSTRUCTION

BACKGROUND OF THE INVENTION

The present invention is directed to improvements in training manikins of the type used by students of cardiopulmonary resuscitation CPR. Training manikins of this type are well known to the art and are meant to simulate conditions in human patients which are to be treated by emergency medical personnel. Thus, the typical training manikin is of the size, shape and weight of a human subject and typically includes analog mechanical structures to correspond with the human organs or body parts which are being manipulated or worked upon by the emergency medical trainee. Exemplary of the patent literature in this field is the earlier U.S. Pat. No. 4,331,426 assigned to Simulaids, Inc., Woodstock, N.Y. which patent is directed to a signaling system for including proper insufflation pressures and chest pressures in a manikin of the size, shape and weight of a newborn or premature baby.

Specifically it is an object of the present invention to provide a manikin in the size and scale of an adult or a child for practicing CPR, which manikin may be assembled and disassembled quickly and easily without any tools. It is a further object of the invention to provide a manikin which has a removable nose/mouthpiece which may be readily cleaned and reused or otherwise disposed of as well as to provide a disposable lung and airway system. It is a still further object of the invention to provide a manikin having a head including a special valving system which prohibits lung inflation when the head is not properly oriented for administration of CPR.

SUMMARY OF THE PRESENT INVENTION

In accordance with the present invention a manikin construction is provided in the form of a torso having a compressible chest simulating the chest of a human patient and a separate head which is removably attached to the neck portion of the torso in a manner which accommodates lifting and tilting mobility of the head so as to teach proper orientation of the head for administration of CPR. The manikin further includes a disposable lung airway system which is connected to the head through a new and improved ball valve assembly which opens only when the head is properly oriented into the correct position for administering CPR and which valve is closed when the head is improperly tilted for the administration of CPR. The new manikin further includes a removable nose/mouthpiece which may be disposed of or cleaned for repeated usage.

While other manikins have been developed to simulate the human anatomy for the purposes of teaching CPR, many of these manikins have utilized complicated valving techniques to simulate the proper orientation of the head for the administration of CPR techniques. That is to say prior art manikins have included valves disposed between the mouth and the lungs of the training manikin which valves close when the head is improperly oriented for the administration of CPR, however, such prior art devices have been extremely complicated and expensive to manufacture.

It is to a new and improved training manikin which may be inexpensively and reliably manufactured to which the present invention is directed. For a better understanding of the manikin of the present invention and for a better appreciation of its attendant advantages as a training device for teaching CPR, reference should be made to the following detailed description of the invention taken in conjunction with the accompanying drawings.

BRIEF DESCRIPTION OF THE DRAWINGS

FIG. 3 is a cross-sectional view showing details of construction of the new ventilating/exhausting system of the new training manikin.

DETAILED DESCRIPTION THE PRESENT INVENTION

Figure 1:
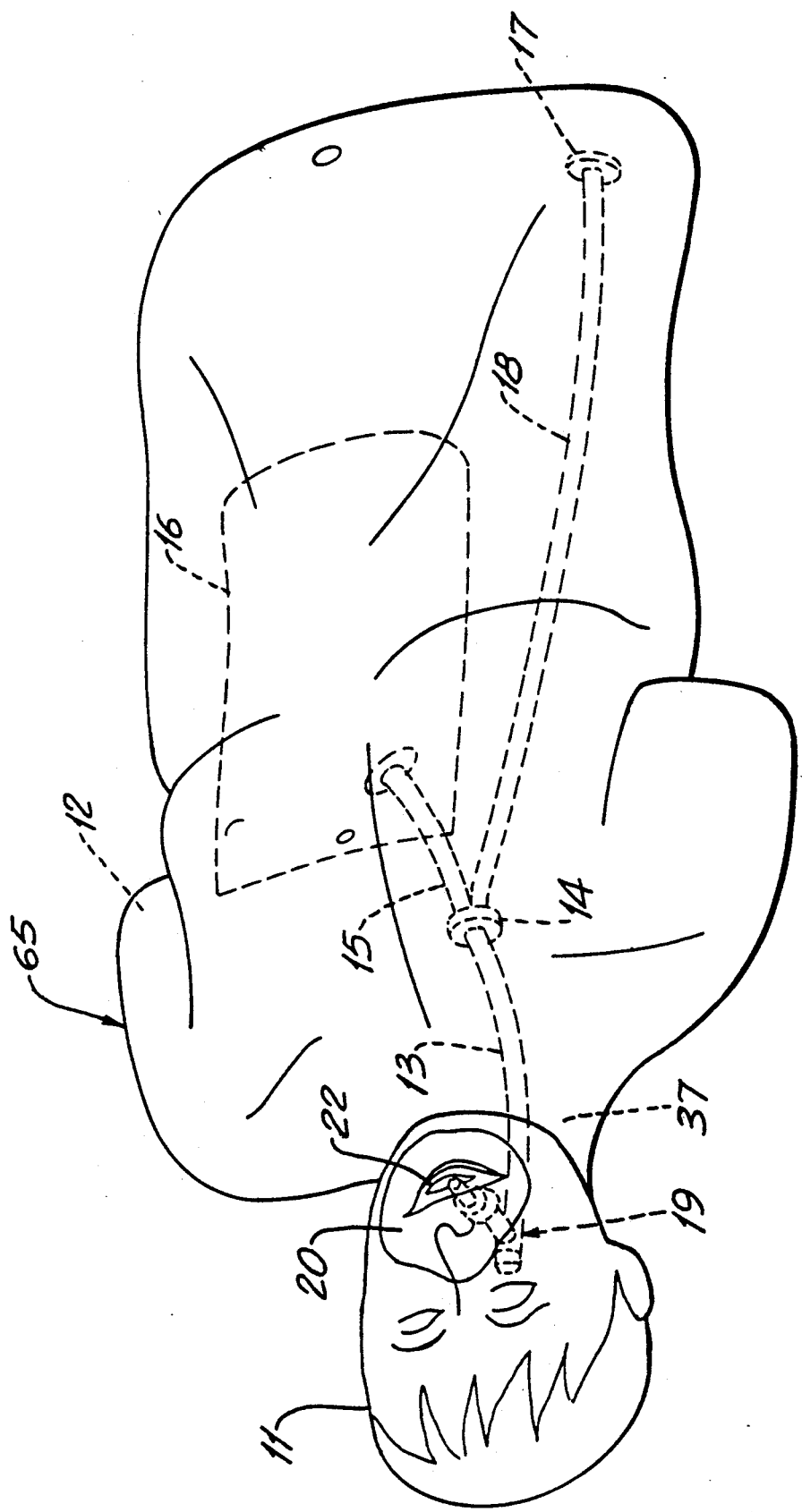
FIG. 1 is a schematic perspective view of a training manikin showing the interrelationship of the head, torso, removable nose/mouthpiece, and interconnected airways and disposable lung bag.
Figure 2:
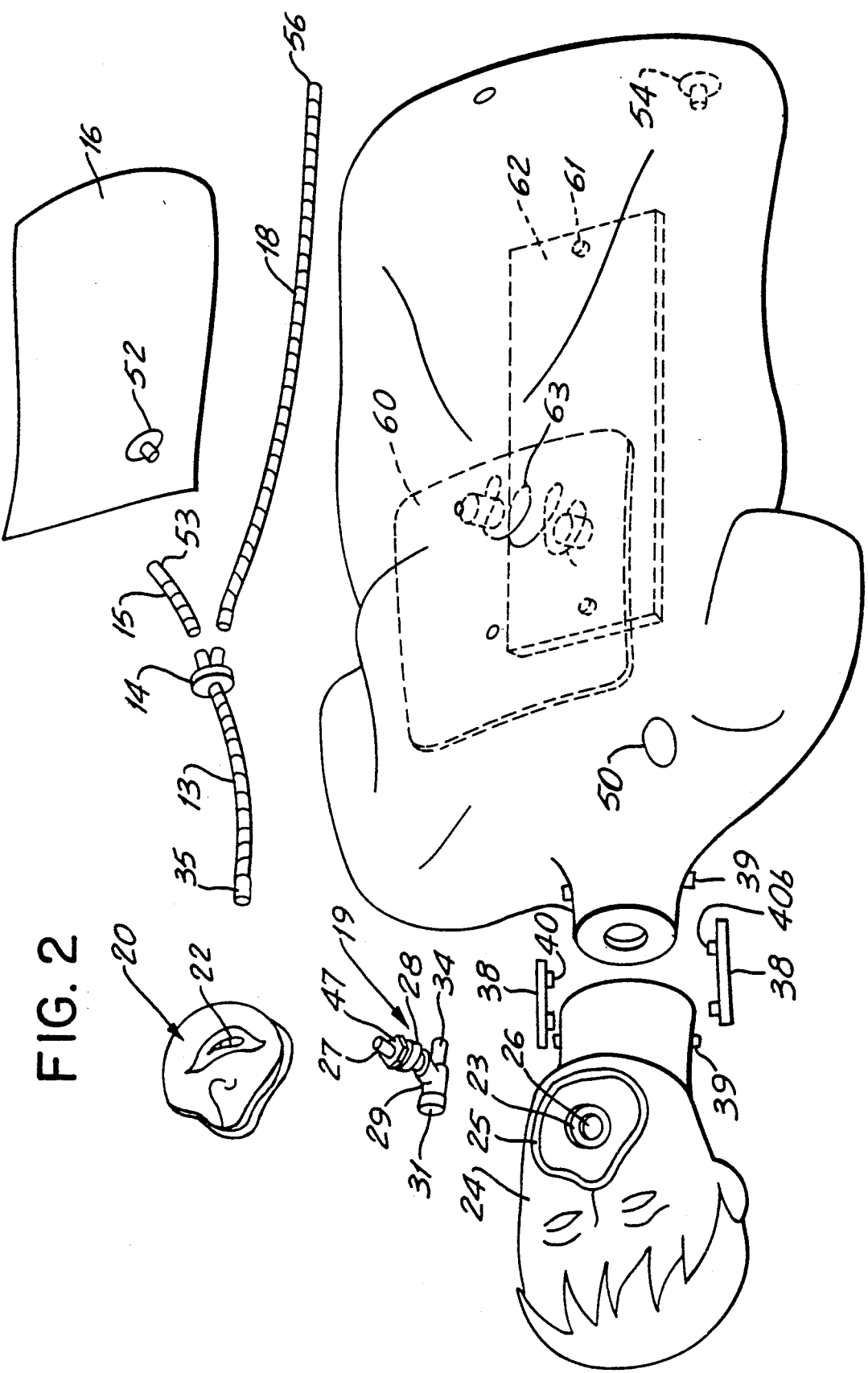
FIG. 2 is an exploded perspective view showing the elements of the new training manikin.

Referring initially to FIGS. 1 and 2, the new training manikin 10 of the present invention includes a removable head 11 with a hollow neck 36 which is secured to a torso 12. The torso is hollow and accommodates the insertion therethrough of an airway 13 leading from the head to a non-rebreathing diaphragm valve 14 which is connected by a flexible airway 15 to a disposable thermoplastic lung bag 16 and which non-rebreathing valve 14 is also connected to an exhaust port 17 by a flexible airway tube 18. In accordance with an important aspect of the invention a special ball valve 19 is affixed to a plate 23 disposed in the head 11 for communication with a disposable nose/mouthpiece 20.

As will be understood and as is common with training manikins, the manikin 10 is anatomically shaped to replicate that of a human torso and includes anatomical landmarks including the jugular notch, a rib cage, sternum, and xiphoid process. The head includes eyes, ears, and a scalp portion while the removable nose/mouthpiece 20 replicates a nose with nostrils and an open mouth. More specifically the hollow nose/mouthpiece 20 is molded from vinyl, rubber, or other elastomeric material enabling the lips of an emergency medical trainee to be disposed over the lips 21 of the mouthpiece for breathing into the manikin to inflate the lung bag 16 in a manner to be described more fully hereinafter. In accordance with the invention, the head 11 has a rigid inner skull member 23 which is generally in the shape of the human skull and which is covered by an outer skin member 24 of vinyl or rubber (or other elastomeric material) which defines the facial characteristics of the manikin including eyes, eyebrows, and hair as shown in FIG. 2. The vinyl skin 24 defines a nosepiece socket 25 which circumscribes a circular throat opening 26 formed in the skull portion 23 as shown in FIG. 2.

In accordance with the principles of the invention, the ball valve assembly 19 is firmly secured to the skull 23 in the oropharyngeal area by means of a locking nut 47. More particularly, the valve assembly 19 includes a projecting mouth tube 27 which is the distal end portion of an inlet body 28 which extends from the valve body 29 of the one-way valve assembly 19. The valve body 29 defines a normally horizontally disposed cylindrical ball chamber 30, the open end portion of which is closed by a plastic cap 31. The valve body has an outlet tube 34 which connects to airway 13 through fitting 35. The body 29 further includes a generally vertical cylindrical portion 32' into which the inlet portion 28 is securely mounted by force fit. The inlet portion 28 may be cemented or otherwise secured to the cylindrical portion 32' as will be understood. As an important aspect of the invention, the canted relation of the mouth portion 27 to the generally vertical portion 28 is arranged such that the ball will be seated in the outlet orifice 33 of the valve body 29 when the head of the manikin is in a position in which CPR should not be administered. However, when the head 11 is slightly tilted such that the ball 32 rolls downwardly and away from the valve seat 33 the valve body will be opened. It is in this position of the head that CPR may be properly administered to a patient being resuscitated. It will be appreciated that the use of a simple ball valve having its geometry correlated to the proper positioning of the head of a patient is a simple and expedient device for effectively teaching trainees how to properly orient the head of a victim before administering CPR. It will be readily understood that, when the head is not properly tilted, the ball 32 will close the valve prohibiting the administration of CPR; however, when the head is properly tilted, the ball 32 will roll away from the seat in orifice 33 and towards the cap 31 opening the valve for inflation of the lung by administration of CPR.

The head 11 of the manikin is secured to the torso 12 by slipping the neck 36 of the head over the corresponding neck portion 37 of the torso 12. The neck 36 of the head is securely fastened to the neck portion 37 of the torso by appropriate fastening straps 38 which connect the neck portions of the head and torso by suitable mechanical snap fasteners 39, 40 or other equivalent mechanical fastening means such as hooked and looped fastening tapes (Velcro Tapes).

The mouthpiece 20 has a circumscribing flange portion 41 of the same size and shape as the socket opening 25 formed in the head 11 so that the mouthpiece may be snapped into place by a simple force fitting, as will be understood. As shown in FIG. 3 the rear wall portion 42 of the nose/mouthpiece 20 includes a cylindrical sleeve portion 43 which is adapted to slide over the projecting mouth tube 27 of the ball valve 19. It will be appreciated that the nose/mouthpiece may be easily slid onto the mouth tube 27 and removed therefrom without difficulty to enable each trainee to use his own molded nose/mouthpiece.

In accordance with a further aspect of the invention the manikin is provided with a disposable plastic lung envelope or bag 16 which is supported externally of the torso 12 adjacent to an aperture 50 which accommodates an airway tube 15 connecting the diaphragm valve 14 and the lung bag 16. The lung bag 16 is disposable and is simply a flat, generally rectangular envelope having front and rear walls heat sealed along the periphery 51 of the lung bag. The lung bag 16 includes a nipple 52 heat welded to a corner portion thereof.

It will be understood that ventilating air may be forced into the lung 16 by breathing into the nose/mouthpiece 20 allowing air to travel through the airway 13 into the one-way non-rebreathing valve 14. The valve 14 in turn permits air coming from the tubing 13 to travel only through the airway 15 and into the lung 16 through the connection of the nipple 52 with the end portion 53 of the airway 15 as shown in FIG. 3. The air which is breathed into the lung 16 by mouth-to-mouth breathing of the CPR resuscitator to the nose/mouthpiece 20 may be expelled from the bag by pushing down on the bag to force the stale air back up through the tube 15 into the one-way valve 14 where it is prohibited from returning through the airway 13 to the mouth but is required to travel back out through the exhaust tube 18 to the atmosphere. The nipple 54 is of comparable construction to the nipple 52 and may be mounted in the torso 12 in a base plate 55 as shown in FIGS. 2 and 3. The airway 18 is connected at its bottom end 56 to the nipple 54 in the same fashion as the connection of the airway 15 to the nipple 52 on the lung 16, as will be understood.

The non-rebreathing valve 14 as shown in FIG. 3, includes a single inlet 57 and ventilating outlet 58 and exhaust port 59. As is conventional in non-rebreathing valves such as this a diaphragm 60 is interposed in such a manner as to close off the exhaust port 59 when air is being breathed into the inlet portion 57 and opening the ventilating outlet 58 to breathed air to go into the lung 16. When air is travelling back from the lung up through the tube 15 and into the one-way valve 14 the diaphragm closes the inlet 57 requiring the stale air to travel out the exhaust port 59. The stale air is then vented to the atmosphere through airway 18 as will be understood. The airway tubes 13, 15 and 18 are made of flexible thermoplastic bellows tubing which provides flexibility and expandability to the airways and facilitates their assembly, disassembly, and removal from the torso for replacement purposes. It will be understood that one of the important aspects of the invention is the ready disposability of each of the airways the non-rebreathing valve 14, and the nose/mouthpieces 20. While the torso 12 is hollow and made of molded vinyl or rubber material, it is provided with a rigid plate 60 on the inner portions of the chest wall. Juxtaposed with the plate 60 and secured by suitable fasteners 61 to the back portions of the torso is a reinforcing plate 62. A steel coil spring 63 is interposed between the plates 62 and 60 to provide the chest cavity with both reinforcement and predetermined resilience so that pressure may be applied to the chest against the force of the spring 63. The characteristics of the spring are selected, as will be understood, to provide verisimilitude to the chest characteristics of the manikin. Since the lung bag 16 is disposed externally of the torso 12, further verisimilitude is obtained by covering the torso and the lung bag 16 with an overlying removable rubber skin portion 65 which envelops the entire torso from the neck portion 37 down to the bottom of the torso. Thus, the lung bag 16, as indicated in FIG. 1, will be interposed between the torso 12 and the over-wrapping skin portion 65 of the manikin when it is used by students. The skin 65 may be fashioned as a garment which opens and closes in the back (by Velcro fasteners, for example).

In the field the training manikin of the invention is provided to CPR students and instructors with a series of replaceable nose/mouthpiece 20 and a comparable series of assemblies of replaceable non-rebreathing valves 14 with attached airways 13, 15, and 18. The individual nose/mouthpieces 20 are supplied so that each student or medical trainee has his or her own mouthpiece which may be used only by that particular student, who may disinfect the mouthpiece after a training session simply by cleaning it with a satisfactory disinfectant. Similarly at the end of each training session the airways and non-breathing valve assembly may be discarded or may be disassembled and appropriately disinfected for futher use.

It will be appreciated that the new manikin promotes hygienic instruction by providing each trainee with a separate nose/mouthpiece the airways and lungs are readily disposable after each training session, while the ball valve assembly may be readily detached from the head for cleaning.

During practice and instruction, when the head is in a neutral position the ball 32 will be in a forward position, seated in the orifice 33 preventing air from entering the lungs, faithfully replicating an obstructed airway of an unconscious patient requiring emergency ventilation. When the head 11 is subjected to proper head tilt and chin lift is properly applied, the ball 32 will roll towards the cap 31, opening the orifice 33 and allowing air to pass through the valve 19, the non-breathing valve 14, and into the lung bag 16. This will cause the bag to inflate and cause a visible rise in the chest. When lung inflation ceases, the valve 14 closes, preventing return of stale air to the nose/mouthpiece 20. As the lung 16 deflates, the stale air is vented through the exhaust tube 18 out of the torso.

The manikin may be simply disassembled by removing the skin 65; removing the straps 38; removing the nose/mouthpiece 20; detaching the lung 16 and airways 13, 15, 18; and unthreading locking nut 47 to free the valve assembly 19. The manikin may be readily stored, transported and then reassembled with fresh replacement elements and a cleaned valve 19.

While the CPR manikin of the present invention has been described for the purposes of illustration with reference to a preferred embodiment, variation will be apparent to those skilled in the art. For example, an indicator system of the type described in U.S. Pat. No. 4,331,426 may be incorporated into the new manikin. Accordingly, the invention is to be limited only as set forth in the appended claims.

We claim:
1. A CPR training manikin including;
  (a) a torso having a hollow chest cavity, an upper neck portion and a lower abdominal portion;
  (b) a lung port at an outer wall of the torso in the general area of the chest; a disposable thermoplastic lung bag supported on said chest adjacent said lung port;
  (c) a stale air exhaust port disposed in the torso remotely of the lung port;
  (d) a separable, tiltable head mounted on the neck of the torso;
  (e) a flexible nose/mouthpiece removably supported on said head portion;
  (f) a rigid plate in said head underlying said nose/mouthpiece;
  (g) a ball valve assembly removably mounted to said plate;
  (h) said ball valve assembly including an inlet mouth tube communicating with a valve body having a ball chamber; an outlet tube communicating with the valve body through an orifice defining a valve seat; and a ball disposed in said chamber and displaceable by gravity from an orifice-opening to an orifice closing position;
  (i) flexible airway tubing communicating between said outlet tube and a non-rebreathing one-way diaphragm valve;
  (j) said diaphragm valve having a housing defining an inlet, a first outlet port allowing ventilating air to flow to the lung bag, and a second exit port allowing lung ventilating air to flow outwardly from the manikin;
  (k) an airway tube connecting said first outlet port to said disposable lung bag;
  (l) an airway tube connecting said second outlet port to said stale air exhaust port; and
  (m) said plastic lung bag is adapted to be inflated by breathing into the nose/mouthpiece while the head is tilted into a CPR-correct position in which the ball in the ball valve assembly is unseated, the orientation of the head in the CPR-correct position properly corresponding to the orientation of a head of a patient which will allow the administrator of CPR to inflate a human lung, and said ball valve is adapted to be closed by the displacement by gravity of the ball into the valve seat when the manikin head is not properly tilted or oriented into a position in which a human patient may be resuscitated by CPR techniques.
2. The CPR training manikin of claim 1 in which
  (a) an elastromeric skin member covers said lung bag and maintains it against the torso.
3. The CPR training manikin of claim 1 in which
  (a) said nose/mouthpiece includes a cylindrical sleeve portion;
  (b) said sleeve portion is mounted on said inlet mouth tube; and
  (c) said ball valve assembly is secured to said plate by a locking nut.
4. The CPR training manikin of claim 1 further including
  (a) spaced reinforcing plate means disposed within said torso in the chest cavity thereof;
  (b) a compression spring acting between said plates;
  (c) whereby said torso may be partially collapsed by the application of external pressure to the chest portion and then restored by said spring.
5. The CPR training manikin of claim 1 in which
  (a) said head is secured to said torso by strap means extending from the lower portions of the head to upper portions of the torso;
  (b) mechanical fastening means secure said strap means to said head and torso.
6. A breathing system for a CPR training manikin, including
  (a) a disposable thermoplastic lung bag having a nipple means secured thereto;
  (b) a disposable non-breathing diaphragm ball valve having an inlet and two outlets;
  (c) a first disposable thermoplastic flexible tubing connected to said inlet and adapted to be connected to a one-way mouth valve;
  (d) a second disposable thermoplastic tubing connected to one of said outlets and to said lung bag;
  (e) a third disposable thermoplastic tubing connected to said other outlet.
  (f) said ball valve being adapted to be removably secured to a manikin by a threaded locking nut; and
  (g) a disposable nose/mouthpiece having a socket for engaging said ball valve.
7. A breathing system for a CPR training manikin having a head, including
  (a) a disposable thermoplastic lung bag having a nipple means secured thereto;
  (b) a disposable non-breathing diaphragm ball valve having an inlet and two outlets and a ball in a valve seat;
  (c) said ball value is adapted to be closed by the displacement by gravity of the ball into the valve seat when the manikin head is not properly tilted or oriented into a position in which a human patient may be resuscitated by CPR techniques;

(d) a first disposable thermoplastic flexible tubing connected to said inlet and adapted to be connected to a one-way mouth valve;
(e) a second disposable thermoplastic tubing connected to one of said outlets and to said lung bag; and
(f) a third disposable thermoplastic tubing connected to said other outlet.

* * * * *